United States Patent [19]

Kawamura

[11] Patent Number: 5,447,130
[45] Date of Patent: Sep. 5, 1995

[54] THERMALLY INSULATING ENGINE

[75] Inventor: Hideo Kawamura, Samukawa, Japan

[73] Assignee: Isuzu Ceramics Research Institute Co. Ltd., Kanagawa, Japan

[21] Appl. No.: 127,372

[22] Filed: Sep. 28, 1993

[51] Int. Cl.⁶ .............................................. F02F 3/24
[52] U.S. Cl. .................................................. 123/269
[58] Field of Search ............... 123/269, 668, 657, 661, 123/193.5

[56] References Cited

U.S. PATENT DOCUMENTS

| Re. 18,429 | 4/1932 | Peterson | 123/269 |
|---|---|---|---|
| 2,511,992 | 6/1950 | Quick | 123/269 |
| 2,851,020 | 9/1958 | Dolza | 123/269 |
| 2,983,268 | 5/1961 | Heintz | 123/269 |
| 3,057,334 | 10/1962 | Bailey | 123/269 |
| 4,561,406 | 12/1985 | Ward | 123/143 B |
| 4,594,668 | 6/1986 | Fujawa et al. | 123/564 |
| 4,672,933 | 6/1987 | Taniguchi et al. | 123/271 |
| 4,781,157 | 11/1988 | Wade et al. | 123/41.71 |
| 4,791,896 | 12/1988 | Bidwell | 123/41.83 |
| 4,998,517 | 3/1991 | Kawamura | 123/270 |
| 5,054,443 | 10/1991 | Kawamura | 123/270 |
| 5,063,881 | 11/1991 | Kawamura | 123/1 A |
| 5,069,194 | 12/1991 | Deutschmann et al. | 123/612 |
| 5,080,081 | 1/1992 | Kawamura | 123/76 |
| 5,277,159 | 1/1994 | Webster | 123/269 |
| 5,279,273 | 1/1994 | Nakata et al. | 123/571 |

FOREIGN PATENT DOCUMENTS 3231112  6/1983  Germany ............................. 123/269

Primary Examiner—David A. Okonsky
Attorney, Agent, or Firm—Staas & Halsey

[57] ABSTRACT

The present invention integrates the combustors and the air intake/exhaust passages in a thermally insulating engine into an assembly to simplify the structure and to space the parts thereof. The space between the subcombustion chamber and the main combustion chamber is reduced by the base installed above the piston head. In addition, a plurality of connection holes are arranged in an oblique radial pattern drilled in the piston head projection creating a vortex within the subcombustion chamber. In the combustion process, the flame expands within the main combustion chamber and mixes with air for combustion. The subcombustion chamber is installed in the center of the cylinder and surrounded by the air intake passage and the exhaust passage. The single-unit structure is made by using a ceramic material for an outer peripheral wall. Additionally, a plurality of the air intakes and exhaust outlets are provided on the piston projection so that respective channels have a wide opening. Further, two turbochargers which allow flexible serial/parallel connection of the turbocharger system, are installed so that a compact and highly efficient system can be obtained.

15 Claims, 4 Drawing Sheets

THERMALLY INSULATING ENGINE

BACKGROUND OF THE INVENTION

1. Field of the Invention

This invention relates to a thermally insulating engine consisting of an assembly of a combustion chamber to burn fuel in the internal combustion engine and its air intake and exhaust passages.

2. Description of the Prior Art

In an engine using combustion energy of fuel as its power source, considerable amount of energy is absorbed to the engine. As a result, thermal expansion causes deformation in the parts related to the combustion chamber. Also, inconvenience such as abnormal explosion of fuel or improper lubrication will occur. To prevent such inconvenience, a cooling device using air or water as a medium is used. Through this cooling, however, thermal efficiency of the engine decreases.

Recently, thermally insulating engines capable of withstanding high temperature and maintaining thermal insulation have been developed by using, for example, ceramics in the parts related to the combustion chamber of the engine. Thus, it is attempted to increase thermal efficiency and decrease the weight by omitting the cooling device, which was conventionally essential for engines.

With this type of engine without a cooling device, the combustion chamber will require a thermally insulating structure, if higher thermal insulation is achieved. In addition, the combustion chamber must be positioned in the center. The drawback of such an engine is that the space for the combustion chamber and the air intake and exhaust passages will be reduced, and their structure will be complex.

To overcome such problems, the purpose of the invention is to provide combustors for the thermally insulating engine by aiming at improving the said points by integrating the parts contacting high-temperature gas in the thermally insulating engine into a single-unit structure.

Another purpose of the invention is to provide a thermally insulating engine by combining a plurality of cylinders in the said thermally insulating engine.

Another purpose of the invention is to provide a thermally insulating engine, which allows a plurality of cylinders to be combined in the said thermally insulating engine and a turbocharger to be effectively combined to the engine.

SUMMARY OF THE INVENTION

To achieve the said purposes, the invention uses thermally insulating material in the parts related to the combustion chamber of the engine. In the thermally insulating engine positioned on the cylinder top of the engine omitting the cooling mechanism, a combustion chamber with a hole penetrating in the direction of the piston top is positioned in the center; and the air intake and exhaust passages, which are adjacent to the said combustion chamber separated with its side wall and which have an intake and an exhaust outlet in the direction of the piston top. The invention provides a thermally insulating engine made into an assembly by surrounding it with outer peripheral walls of both passages.

In the said engine, the combustion chamber is positioned in the center and surrounded with the air intake and exhaust passages separated with side walls of ceramics made of thermally conductive material, so that the engine is structured into an assembly by the outer peripheral walls of these passages. Thus, the said combustion chamber can be installed in the center and the parts contacting high-temperature gas generated through combustion will be insulated. Therefore, the air intake system and the exhaust system can coexist, each system is provided with a wide space, and structural complexity can be avoided.

In the combustion chamber of the thermally insulating engine having a subcombustion chamber to create thermally insulating structure, the invention provides a thermally insulating engine with: a truncated cone base installed on the piston head which reduces the coupling channel between the subcombustion chamber, which is installed in the center above the cylinder head, and the main combustion chamber above the piston; and a plurality of connection holes arranged in an oblique radial pattern in the opposite cylinder head, which is separated with the reduced coupling channel, to generate vortex.

The said engine is equipped with a plurality of connection holes arranged in an oblique radial pattern to properly reduces the channel space between the main combustion chamber and the subcombustion chamber as well as to generate vortex in the said channel. Therefore, in the compression process, vortex is generated in the subcombustion chamber to facilitate mixture with injected fuel. In the combustion process, the flame blown from the subcombustion chamber is carried by swirl generated by the oblique connection holes and mixed with air to perform good combustion.

This invention provides the combustor integrated into an assembly by placing the combustion chamber, which is installed above the cylinder of the said engine and positioned in the center, adjacent to the surrounding air intake and exhaust channels separated by a partition made of thermally insulating material with high strength in the thermally insulating combustor and the turbo compound device of the engine with heat resistance, which omits the cooling device and has the turbocharger; two turbochargers, which are coupled to the said air intake and exhaust channels and equipped with turbine scroll made of the same material as with the said partition; and the thermally insulating engine having the means of switching control to switch the supercharge system of the turbocharger between serial and parallel according to the combustion condition of the said combustor.

The said engine is formed into the combustor, which is made into a compact combustor by integrating the combustion chamber positioned in the center and the surrounding air intake and exhaust channels into an assembly by the partition made of thermally insulating material. The two turbochargers are coupled to the said combustor. And, the opening/closing valves are installed in the coupling channels of these turbochargers. The opening/closing valves are controlled in accordance with the combustion condition of the said combustor. The supercharger system of the turbochargers is switched between serial and parallel connection to provide highly efficient operation.

DETAILED DESCRIPTION OF THE PREFERRED EMBODIMENT

The following paragraphs give a detailed explanation of the example 1 of the invention by using drawings.

Figure 1:
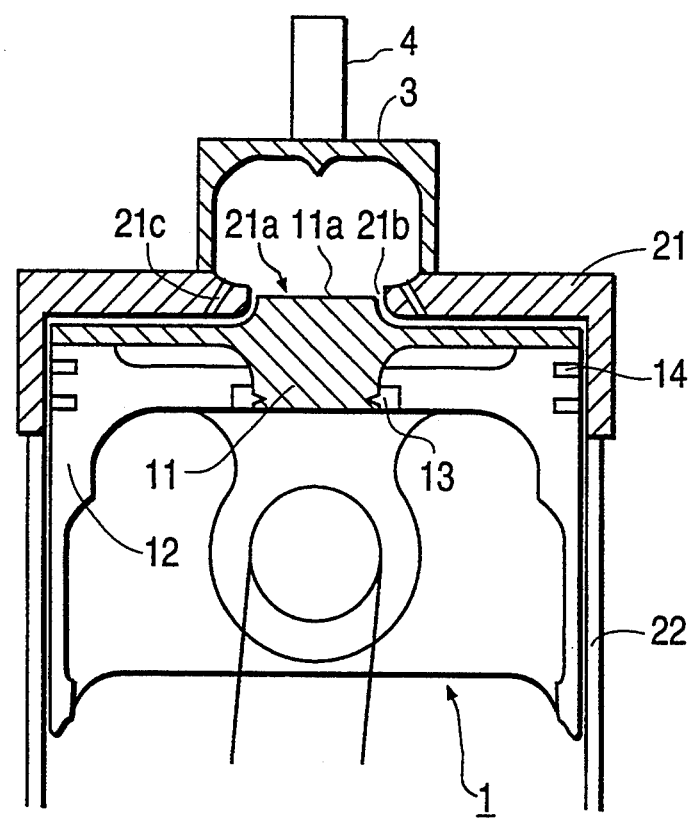
FIG. 1 is a cross-sectional profile of an example of the combustor of the thermally insulating engine related to the invention.
Figure 2:
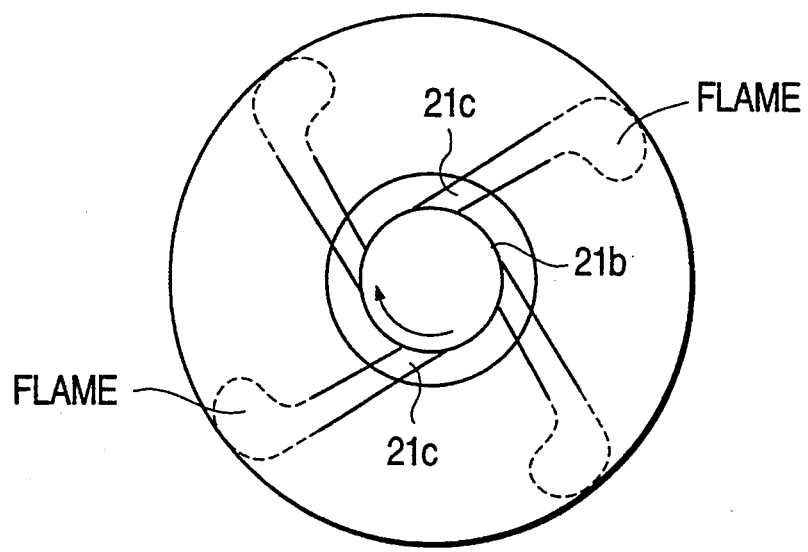
FIG. 2 is a top view of an example of the combustor of the thermally insulating engine related to the invention.

FIG. 1 shows the cross-sectional profile of the combustion chamber of the thermally insulating engine related to the invention. FIG. 2 shows the top view of the combustion condition in the main combustion chamber.

In these drawings, the piston 1 has the piston head 11 and the piston body 12 made of ceramics with high strength and heat resistance. They are mutually linked with the coupling ring 13.

In the center on the upper surface of the piston head 11, the truncated cone base 11a with the bottom with gentle outline is installed. The upper surface is formed in such a way that it slightly rises from the bottom to the peripheral portions and the main combustion chamber is formed between the upper inner wall of the cylinder. The piston ring 14 is engaged in the upper portion of the piston body 12.

The cylinder 2 has the cylinder head 21 and the cylinder liner 22 made of thermal conducting ceramics with resistance against high temperature. The subcombustion chamber 3 made of ceramics with high strength is installed on the upper portion of the hole 21a in the center of the cylinder head 21.

The corners of the hole edge 21b of the hole 21a, which is the channel between the subcombustion chamber 3 and the main combustion chamber, are cut according to the bottom of the base 11a of the said piston head 11. As shown in FIG. 2, a plurality of connection holes 21c is notched in the oblique radial direction at the specified angle. As FIG. 2 shows, the connection hole 21c is arranged in the oblique pattern to the virtual face, which extends in the radial direction from the center line of the cylinder 2. The nozzle 4, which injects fuel, is installed in the center of the upper wall of the subcombustion chamber 3. The nozzle 4 is designed to inject the fuel to the subcombustion chamber 3 at the end of the compression process, and the fuel is ignited in the subcombustion chamber by air of high temperature, which has risen during adiabatic compression. Thus, the internal pressure in the subcombustion chamber 3 rises within a short time and the fuel is injected from the said connection hole 21c into the main combustion chamber between the piston 1 and the cylinder 2. The reduction of the gap between the hole 21a of the cylinder head 21 and the bottom of the base 11a of the piston head 11 at the top-dead center of the piston 1 is designed to be between 3 and 10 percent in comparison with the area of the piston. The connection hole 21c connecting the subcombustion chamber 3 and the main combustion chamber must not always be a hole as shown in the example. They may be a groove.

The following paragraphs explain the operations of the example 1 consisting of such a configuration. In the compression process, the piston 1 goes up according to the rotation of the crankshaft and compresses air, then compresses air in the subcombustion chamber 3. Towards the end of the process, the air current through the connection hole 21c generates vortex in the subcombustion chamber when the peripheral edge of the base 11a approaches the lower edge of the hole 21a. This vortex expands from the lower portion towards the upper portion of the subcombustion chamber 3. When the peripheral edge of the base 11a reaches the upper edge of the hole 21a, the space between the peripheral edge of the base 11a and the peripheral edge of the hole 21a is reduced. From this reduced space, air will be blown upwards in the subcombustion chamber 3. Therefore, air current in the reverse or radius direction to the said vortex will be generated at the end of the process.

When fuel is injected from the nozzle 4, the said air current generates mixed air in the subcombustion chamber 3, and the fuel is ignited. Thus, the pressure in the subcombustion chamber 3 will rapidly increase. However, the amount of oxygen within the subcombustion chamber 3 is insufficient to burn the entire amount of fuel. Therefore, unburned gas and combustion flame blow out in a swirl from the connection hole 21c into the main combustion chamber between the piston 1 and the cylinder 2 (see FIG. 2). The tip of the gas hits the face of the outer side wall of the main combustion chamber, and the unburned gas contacts and mixes with air in the extensive part within the main combustion chamber. As a result, combustion expands rapidly in the main combustion chamber, and combustion gas expands and pushes down the piston 1. The initial stage of combustion in the said example 1 is performed with an abundance of fuel in the subcombustion chamber 3. Therefore, generation of NOx is controlled. The combustion condition of the middle- to latter periods of combustion shows that unburned gas injected from the subcombustion chamber 3 into the main combustion chamber burns in an extensive area of the main combustion chamber and thus the fuel mixes well with air for combustion. Thus, generation of black smoke is controlled.

The said example 1 is designed to have the oblique connection holes to generate vortex to the air, which passes between the main combustion chamber above the piston of the thermally insulating engine with a subcombustion chamber and the subcombustion chamber, or to burning mixed air. Therefore, in the compression process, the air compresses by the piston generates vortex in the subcombustion chamber and thus generation of mixed air is actively performed. As a result, thick mixed air, including flame from the subcombustion chamber, becomes vortex in the combustion chamber above the piston during the initial stage of the combustion process. Thus, the vortex mixes well with air within the main combustion chamber for combustion. As a result, Nox and black smoke within exhaust gas will reduce.

The following paragraphs give a detailed explanation of the example 2 of the invention by using drawings.

Figure 3:
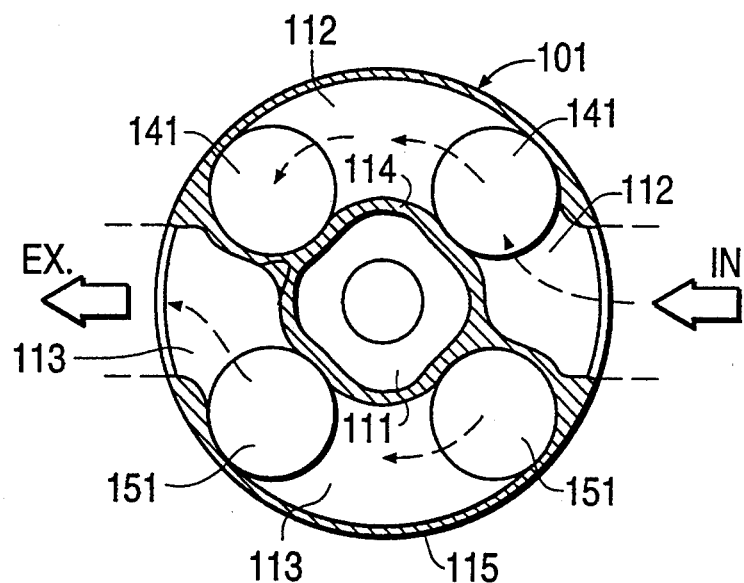
FIG. 3 is a cross section of the example 2 of the combustion chamber of the thermally insulating engine related to the invention.
Figure 4:
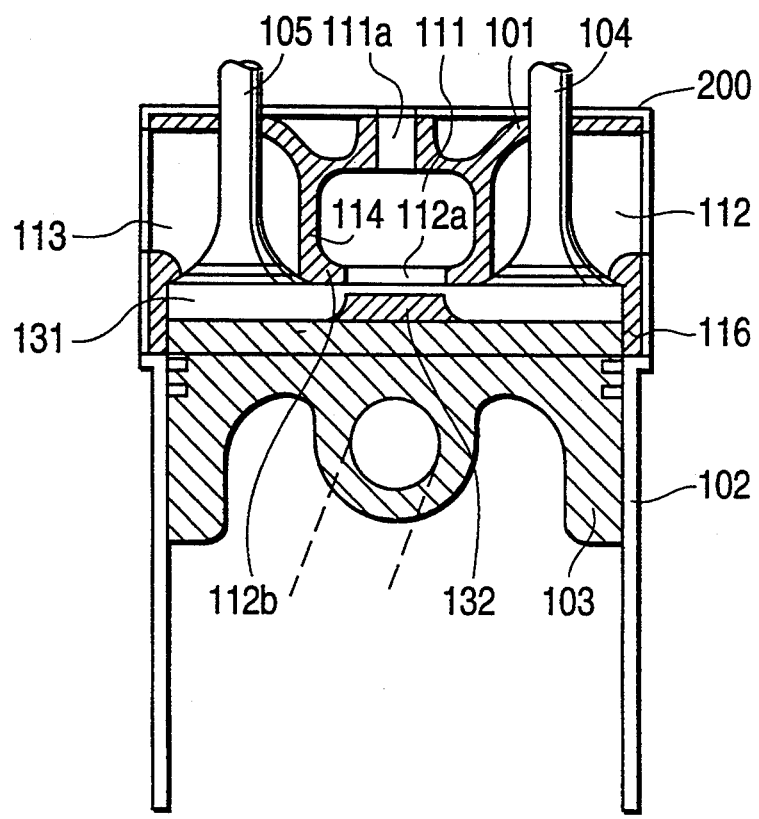
FIG. 4 is a drawing explaining the combustion condition of the example 2.

FIG. 3 shows the cross-sectional view of the example 3 of the thermally insulating engine related to the invention. FIG. 4 shows its longitudinal section.

In these drawings, 102 is the cylinder, 103 is the piston. The combustor 101 in the example 3 is placed as the cylinder head on each cylinder. The combustor 101 has a flat cylindrical shape. Its structure will be explained in the Detail 3 in the next example. Each of these combustors 101 is set into the cylinder head block (part of it is shown as No. 200 in FIG. 4), which is molded by casting.

The subcombustion chamber 111 is placed in the center of the combustor 101. In the part near the outer peripheral wall 115, the air intake passage 112 and the exhaust passage 113, which are made into the shape of an arc, are provided. These passages as well as the side wall 114 and the outer peripheral wall 1115 of the subcombustion chamber 111 have fine heat insulation. These parts use compound ceramics made of silicon nitride ($Si_3N_4$), which has thermal conductivity, and titanium oxide (TiO) or aluminum titanate ($Al_{12}TiO_5$). To enhance molding and casting performance, these parts are formed so that they have uniform wall thickness. The injection nozzle hole 111a is drilled in the upper wall of the subcombustion chamber 111, and the hole 112a penetrating to the space 131, which is the combustion chamber on the top of the piston 103, is drilled in the lower wall. The outer wall 116 in the lower portion, which is coupled to the cylinder 102, uses ceramics made of silicon nitride ($Si_3N_4$) with high strength. The base 132 is installed on the top of the piston 103 and acts as the same as with the base 11a in the example 1.

In the peripheral edge of the hole 112a, a plurality of connection grooves 112B is provided. Likewise the example 1, the connection 112b is cut to be slant to the virtual face expanding in the radial direction from the center line of the cylinder 102.

The air intake 141 is equipped with the air intake valve 104 to guide fresh air by connecting the air intake passage 112 to the cylinder inside when the valve is open. To increase the area of the opening, two air intakes 141 and 141 are drilled, for example.

The exhaust outlet 151 is equipped with the exhaust valve 105 to discharge exhaust gas after combustion via the exhaust passage 113 when the valve is open. Likewise the air intake 141, two exhaust outlets are provided.

The combustor 101 with the air intake/exhaust channels and the combustion chamber, as mentioned above, is molded as a single unit by using ceramics only, without using metal.

The following paragraphs explain the operations of the example consisting of such a configuration. As mentioned before, the subcombustion chamber 111, in which fuel is burned, and the exhaust passage 113 and the air intake passage 112, which are subject to high temperature, are separated with the side wall 114 and other parts made of ceramics of thermal conductive material. Therefore, the high temperature caused by combustion heat will be blocked, even though these parts are adjacent to the subcombustion chamber by the single-unit structure. Thus, normal operation processes of the engine, including air intake, explosion and exhaust, will be performed without adverse influence. Also, the space required for the air intake passage 112 and the exhaust passage 113 can be reduced. In addition, a plurality of the air intakes 141 and the exhaust outlets 151 is installed, making air intake and exhaust to be efficiently performed. Thus, the piston 103 is powerfully driven to generate engine torque.

According to the example 2, the subcombustion chamber is positioned in the center and the air intake and exhaust passages are arranged adjacent to the subcombustion chamber, the ceramics made of thermal conductive material with heat resistance is used as side wall to form an assembly, and such an assembly is mounted on the top of the cylinder to form the thermally insulating engine. Thus, a wide space can be obtained for the subcombustion chamber and the air intake and exhaust passages. In addition, structural complexity of the subcombustion chamber can be avoided.

In the example 2, two air intakes and exhaust outlets are provided, respectively. Thus, resistance in the air intake and exhaust channels is reduced, making it an efficient engine.

Also, casting the ceramics by using a material with high casting performance will reduce the production costs.

The following paragraphs give detailed explanation of the example 3 of the invention by using drawings.

Figure 5:
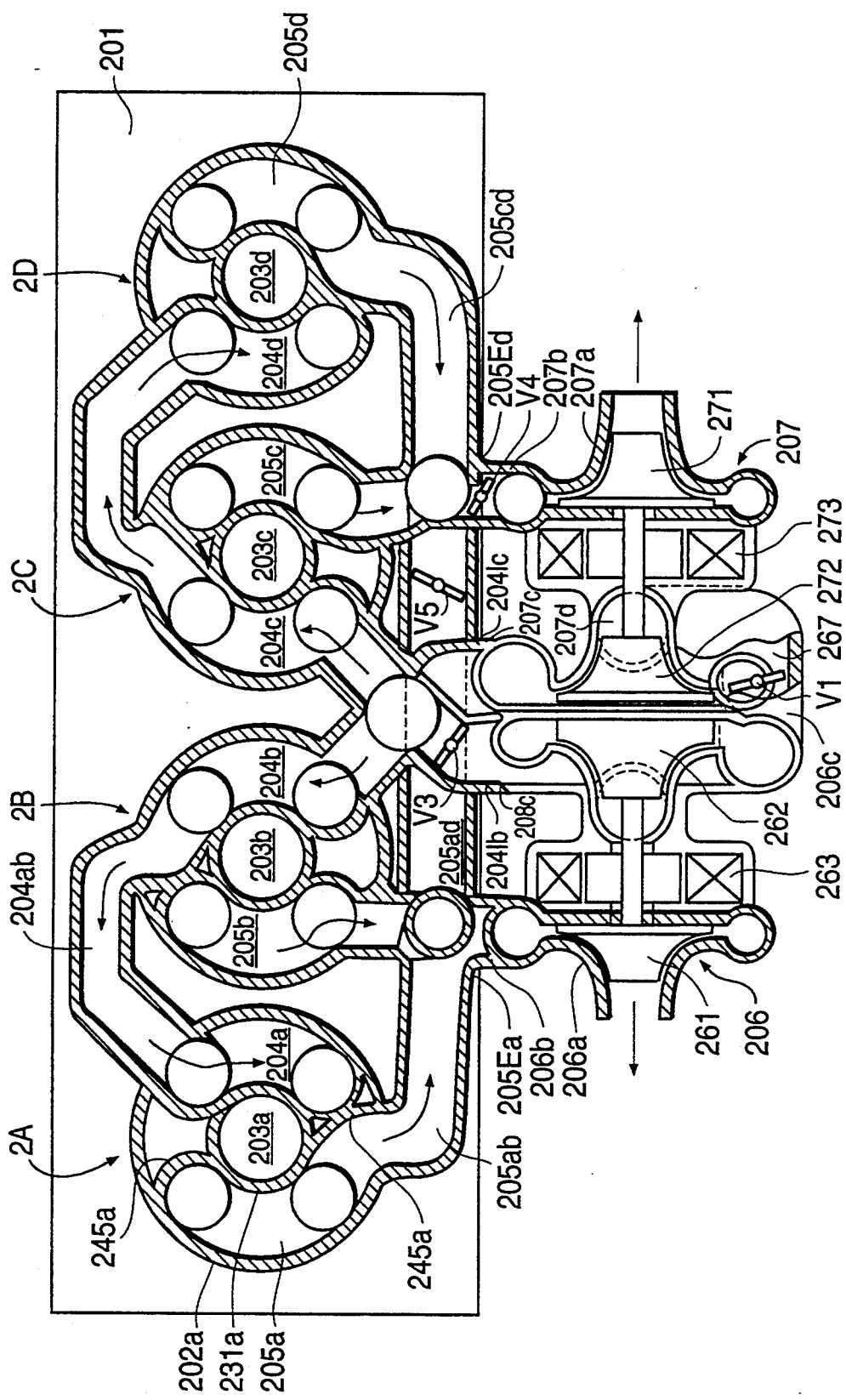
FIG. 5 is a top view of allocation of the example 3.
Figure 6:
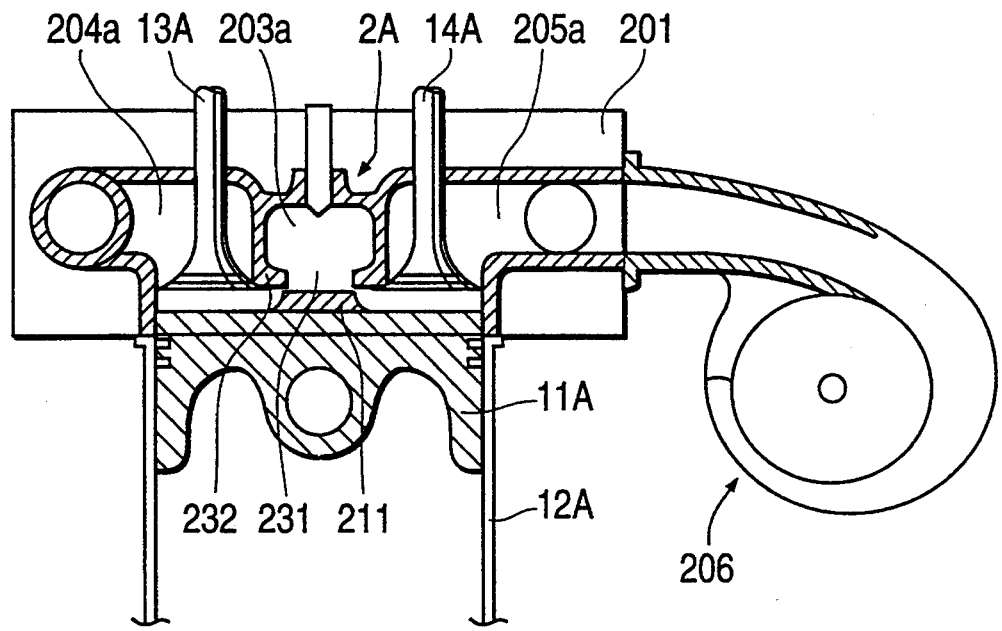
FIG. 6 is a cross-sectional profile of part of the example 3.
Figure 7:
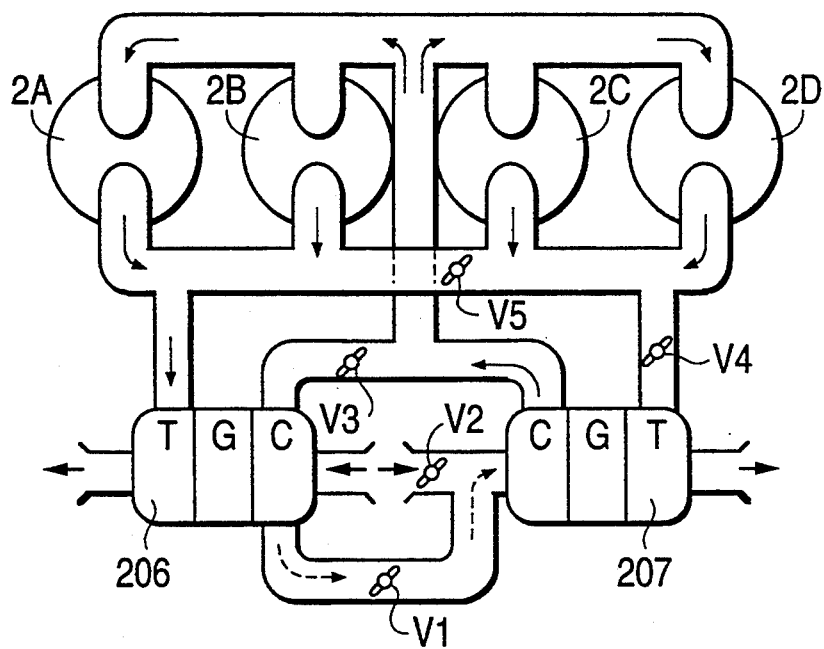
FIG. 7 is a drawing explaining the channels showing the relation between the air intake/exhaust channels and the valves in the example 3.

FIG. 5 shows the top view of allocation of the example 3 of the invention. FIG. 6 shows the cross-sectional profile of part of the example 3. FIG. 7 shows the channel drawing explaining the relationship between the air intake and exhaust channels as well as the valves of the example 3.

In these drawings, the box 201 is positioned above the engine having four cylinders. Inside the box, the subcombustion chambers 203a to 203d corresponding the four cylinders, the air intake channels 204a to 204d, the exhaust channels 205a to 205d, and the connection channels are integrated into an assembly. These parts use material flexible for casting. They are molded by casting and stored in the box.

The following paragraphs explain the part of the assembly, which is positioned in the left in FIG. 5. Separated by the peripheral wall 231a, which forms the subcombustion chamber 203a in the center, made of ceramics using alumina ($Al_{11}O_3$) or aluminum titanate ($Al_{12}TiO_5$), the arc exhaust channel 205a in the left and the arc air intake channel 204a in the right are formed with the outer peripheral wall 202a and the air intake and exhaust partition 245a, which are made of ceramics of the same material. Thus, the subcombustion chamber and the air intake and exhaust channels are made into an assembly as the combustor 2A, below which the cylinder 12A with the piston 11A, as shown in FIG. 6, is installed. Thus, the engine having the air intake valve 13A and the exhaust valve 14A is formed.

The base 211 is installed on the top of the piston 11A and acts as same as with the base 11a in the example 1.

A plurality of connection grooves 232 is provided around the peripheral edge of the hole 231 coupling the subcombustion chamber 203a and the main combustion chamber. Likewise the example 1, the connection groove 232 is cut to be slant to the virtual face extending from the center line of the cylinder 12A in the radial direction. The combustor 2B is adjacent to the right side of the combustor 2A in the said FIG. 5, and is made into almost the same structure as with the combustor 2A. The air intake coupling channel 204ab couples the mutual air intake channels 204a and 204b. The exhaust channels 205a and 205b are coupled by the exhaust coupling channel 205ab.

The set of combustors 2C and 2D is made into almost the same structure as with the set of combustors 2A and 2B in such a manner that the left and right are reverse. The exhaust coupling channel 205ab and the exhaust coupling channel 205cd of respective sets are connected with the coupling channel 205ad, and the opening/closing valve V5 is installed in the middle of the channel. The channels at the both ends of the coupling channel 205ad is guided to the side face of the box 201 and openings are made in the specified positions as the exhaust sending outlets 205Ea and 205Ed.

The air intake channel 204b of the combustor 2B and the air intake channel 204c of the combustor 2C are also coupled in such a manner that they are mutually connected. Because these air intake channels are connected to the supercharged air channel from the two turbochargers, they are branched into two channels and openings are made in the specified positions in the side face of the box 201 as the air intakes 204Ib and 204Ic.

The turbochargers 206 and 207 have the turbines 261 and 271, the compressors 262 and 272, and the rotary electric machines 263 and 273. Respective turbines driven by exhaust energy rotate the compressors respectively coupled to the turbines and compress air to supply it to the engine as supercharged air. Respective rotary electric machines mounted to the turbine shaft are supplied with power from the battery, etc. when the engine rotates at a low speed and under a high load in accordance with the operation condition of the engine to operate as an electric motor. The rotary electric machines are designed to add the engine torque by increasing the supercharged air, or operate as an electric generator when there is sufficient exhaust energy to collect exhaust energy as electric power and add engine torque by supplying the said power, for example, to the electric motor combined to the crankshaft.

The turbine housings 206a and 207a with the turbine scroll of the turbochargers 206 and 207 are molded by using ceramics material with heat resistance and high strength. Their exhaust intakes 206b and 207b are formed so that they are directly connected to the said exhaust outlets 205Ea and 205Ed. The supercharged air supply outlets 206c and 207c of these turbochargers are directly connected to the said air intakes 204Ib and 204Ic. The supercharged air supply channel 206c in the lower portion of the turbocharger 206 is coupled to the fresh-air intake 207d via the connection tube 267. The opening/closing valve V1 is installed in the middle of the connection tube 267, and the opening/closing valve V2 is installed in the direction of outside air of the fresh-air intake 207d. Therefore, if the opening/closing valve V2 is closed and V1 is opened when the both turbochargers 206 and 207 are driven, the supercharge system of the both turbochargers is connected in series to perform 2-stage supercharge so that high-pressure supercharged air is supplied to the engine.

The opening/closing valve V3 is provided in the supercharged air supply channel of the turbocharger 206. The opening/closing valve V4 is provided in the exhaust insertion channel to the turbocharger 207. Opening/closing of the valves V3 and V4 as well as the said valves V1, V2 and V5 is designed to be controlled by the instruction from the controller consisting of an electronic control device.

The following paragraphs explain the operations of the example 3 consisting of such a configuration.

Inside the box 201, the combustors 2A to 2D for the four cylinders are installed. In other words, the subcombustion chambers 203a and 203d, the air intake channels 204a to 204d, the exhaust channels 205a to 205d, and their coupling channels are cast so that they are mutually coupled as mentioned before with respective incoming/outgoing channels from/to the turbochargers 206 and 207. Therefore, the four-cylinders engine is assembled by installing the box 201 on the upper portion of the four cylinders.

The combustors 2A to 2D are respectively equipped with the subcombustion chamber in the center and the respective air intake channels and exhaust channels adjacent to the subcombustion chamber separated with the peripheral wall and the air intake/exhaust partition made of thermal conductive material. Because thermal insulation is proper, normal air intake, explosion and exhaust processes are performed without any problem and adverse influence to operate the engine.

As shown in the block diagram in FIG. 7, when the opening/closing valves V1 to V5 installed in the channels of the turbochargers 206 and 207 are controlled so that for example, V5 of the exhaust system is closed and V4 is open, and V1 of the supercharged air system is closed and V2 and V3 are open, both the turbochargers 206 and 207 are driven by exhaust energy from the set of combustors 2A and 2B and the set of combustors 2C and 2D, which consists of two cylinders respectively, to perform parallel operation. Thus, supercharged air is supplied to the four combustors to perform normal operation.

When controlling the opening/closing valve V5 of the exhaust system to close and V4 to open, V2 and V3 of the supercharged air system to close, and V1 to open, the compressed air produced by the operations of the turbocharger 206 is guided to the turbocharger 207 via the channel equipped with the opening/closing valve V1 to be recompressed. As a result, strong supercharged air produced by the 2-stage turbochargers 206 and 207, which is connected in serial, is supplied to the respective combustors 2A to 2D to perform operation.

In the example mentioned above, the combustion chamber for the four cylinders and its air intake and exhaust channels are separated with the wall made of material with low thermal conductivity to form the four compact combustors, which are placed adjacent, so that they are cast inside a single box. Therefore, the effect can be obtained that the four-cylinder engine can be easily assembled by installing the box on the four cylinders. In addition, the supercharge system is designed to be flexibly switched between serial and parallel connection by installing the two turbochargers, which can be easily connected, and by controlling the opening/closing valves. Therefore, the supercharged air pressure can be properly controlled in accordance with the operation condition of the engine. As a result, a highly efficient engine can be obtained.

Thus, the invention has been explained by using examples. Within the scope of the purpose of the invention, variations and applications are possible to operate, for example, the rotary electric machine installed to the turbocharger as an electric motor or an electric generator in accordance with the operation condition of the engine. Therefore, these variations and applications should not be excluded from the scope of the invention.

What is claimed is:

1. A thermally insulating engine including:
 a cylinder;
 a piston, which operates in said cylinder, having an upper surface formed of a ceramic material;
 a truncated cone projection installed in the center of the upper surface of the said piston;
 a cylinder head made of a heat insulating ceramic material, which covers the top of said cylinder;

a hole drilled in the center of said cylinder head and which engages the truncated cone projection when said piston reach top dead center;

a cup shaped subcombustion chamber formed in said cylinder head, which is installed on the upper portion of said hole and connected to the cylinder via said hole;

a fuel injection nozzle to inject fuel into the subcombustion chamber; and an air connection passage, which is installed apart from said hole to couple said subcombustion chamber and said main combustion chamber.

2. A thermally insulating engine according to claim 1, wherein said air connection passage is made from a plurality of small holes.

3. A thermally insulating engine according to claim 1, wherein the entire area of the connection hole of the said air connection passage is between three and ten percent of piston area.

4. A thermally insulating engine according to claim 1, wherein said air-connection passage penetrates in a slant direction to a virtual face extending from the center line of the cylinder towards radial direction.

5. A thermally insulating engine according to claim 1, wherein said ceramic material used in the subcombustion chamber is silicon nitride.

6. A thermally insulating engine according to claim 1, wherein said ceramic cylinder head forming the subcombustion chamber with a side wall, said side wall including air intake/exhaust passages, the air intake/exhaust outlets lying in a direction parallel to the piston top, and said ceramic cylinder head being made into a single-unit structure by the surrounding outer peripheral walls of both passages.

7. A thermally insulating engine according to claim 6, wherein said cylinder head is set into the cylinder block.

8. A thermally insulating engine according to claim 6, wherein side and outer peripheral walls of said subcombustion chamber have a uniform wall thickness.

9. The thermally insulating engine according to claim 1, further comprising:

a cylinder head assembly installed above a piston, locating the subcombustion chamber in the center of said piston adjacent to the surrounding air intake and exhaust channels separated by said cylinder head made of thermally insulating material with high strength;

a turbocharger system including two turbochargers, coupled to said air intake/exhaust channels having a turbine blade made of the same material as the cylinder head; and switching control means to switch the turbocharger system between serial and parallel in accordance with the combustion condition of the fuel.

10. A thermally insulating engine according to claim 9, wherein said insulating material is a ceramic comprising alumina ($AL_2O_3$) or aluminum titanate ($AL_2TiO_5$).

11. A thermally insulating engine according to claim 9, wherein said switching control means are made by arranging opening/closing valves in a coupling channel of the two turbochargers and by switching the turbocharger system through selected operation of said opening/closing valves.

12. A thermally insulating engine according to claim 7, wherein said fuel injection nozzle installed in the subcombustion chamber comprises a plural-injection nozzle.

13. The thermally insulating engine according to claim 1, wherein said air connection passage comprises a plurality of grooves arranged in an oblique radial pattern.

14. A thermally insulating engine, wherein the combustion chamber areas are made of an insulating material, comprising:

a cylinder;

a piston, which operates in said cylinder, the upper surface said piston comprising a ceramic material;

a truncated cone projection centered on the upper surface of said piston;

a cylinder head, in which a subcombustion chamber is formed, said cylinder head comprising a ceramic material;

a connection hole, for connecting the cylinder with the subcombustion chamber, said connection hole extending through the cylinder head and located such that the truncated cone projection engages with the connection hole when the piston reaches the top dead center position;

a fuel injection nozzle, for injecting fuel into said subcombustion chamber;

an air connection passage, located on said truncated cone projection, connecting said connection hole and said cylinder when the piston reaches the top dead center position.

15. A thermally insulating engine according to claim 13, wherein said air connection passage comprises at least one connection passage arranged in an oblique radial pattern such that during the compression process, a vortex is generated in said subcombustion chamber to facilitate mixture of the injected fuel 10 and during the combustion process, the flame expands from the subcombustion chamber in a swirl pattern thereby increasing combustion efficiency.

* * * * *